(12) United States Patent
Seamans

(10) Patent No.: US 9,967,693 B1
(45) Date of Patent: May 8, 2018

(54) ADVANCED BINAURAL SOUND IMAGING

(71) Applicant: Randy Seamans, Rockwall, TX (US)

(72) Inventor: Randy Seamans, Rockwall, TX (US)

( * ) Notice: Subject to any disclaimer, the term of this patent is extended or adjusted under 35 U.S.C. 154(b) by 0 days. days.

(21) Appl. No.: 15/157,280

(22) Filed: May 17, 2016

(51) Int. Cl.
*H04S 7/00* (2006.01)
*H04S 1/00* (2006.01)
*G06N 3/02* (2006.01)

(52) U.S. Cl.
CPC ............... *H04S 7/306* (2013.01); *G06N 3/02* (2013.01); *H04S 1/007* (2013.01); *H04S 2420/01* (2013.01)

(58) Field of Classification Search
CPC ...... H04S 7/306; H04S 1/007; H04S 2420/01; G06N 3/02
See application file for complete search history.

(56) References Cited

U.S. PATENT DOCUMENTS

| | | | | |
|---|---|---|---|---|
| 2006/0045274 | A1* | 3/2006 | Aarts | H04S 1/005 381/17 |
| 2008/0137870 | A1* | 6/2008 | Nicol | H04S 1/002 381/17 |
| 2011/0109722 | A1* | 5/2011 | Oh | H04S 5/00 348/44 |
| 2014/0198918 | A1* | 7/2014 | Li | H04S 7/30 381/26 |
| 2015/0373477 | A1* | 12/2015 | Norris | H04M 1/72572 381/303 |

* cited by examiner

*Primary Examiner* — Ping Lee
(74) *Attorney, Agent, or Firm* — Polsinelli LLP

(57) ABSTRACT

Monaurally-recorded mono or stereo recordings may be processed and converted into binaurally-recorded audio recordings. An analog process of performing this involves output of at least subsets of the monaurally-recorded recording, such as isolated instrument/vocal tracks, to be played to a dummy with two microphones. A digital process of performing this includes simulating audio input from simulated locations corresponding to audio sources. A neural network process of performing this includes training a neural network using speakers and microphones and then automating conversion from monaural audio to binaural audio based on the training of the neural network. The neural network can also be trained with output speakers to eliminate or reduce dead zones and/or speaker crosstalk.

19 Claims, 8 Drawing Sheets

ADVANCED BINAURAL SOUND IMAGING

BACKGROUND OF THE INVENTION

Field of the Invention

The present invention generally concerns audio recording, sound representation, processing and playback. More specifically, the present invention concerns processing and remastering audio to simulate a binaurally-recorded three-dimensional soundstage that retains compatibility with traditional audio output equipment.

Description of the Related Art

Audio playback has improved at a slow pace since its invention. Early audio recording listeners were amazed to be able to recognize sounds at all. While improvements have been made to the fidelity of recordings and playback since then, stereo audio output has generally remained the most commonly used audio output format for the last several decades.

Recording sounds for reproduction and playback of music and/or spoken word has a long history, starting from wax cylinder recordings in the 1870s and gradually progressing in fidelity and convenience to digital recordings in more modern times.

While audio playback convenience has increased over time, little has changed regarding improvements to listeners' perceptions of sound. The first recordings were recorded with "mono" channel output in mind, such as one or more loudspeakers all playing the exact same sounds. Mono channel recordings were typically recorded "monaurally," or using a single microphone.

Stereo playback, unlike mono playback, typically includes two channels, meaning that two speakers playing a stereo audio track might vary in the actual sound waveforms that they output. Stereo playback, however, is still typically recorded monaurally. Producers generally record instrumental tracks separately and tweak the volumes of each instrumental track between the left and right channel to simulate a soundstage. Such recordings generally do not factor effects of natural ear spacing or "head shadow" of the head and ears, both of which can effect timing (e.g., interaural time differences or "ITDs") and various level values associated with various audio properties such as volume, frequency, pitch, reverberation, all of which can prevent typical monaurally-recorded stereo recordings from sounding natural to listeners. Thus, while traditional stereo playback is a definite improvement over mono playback, it still remains a relatively poor approximation of what a live listener would hear.

Binaural recording is different from monaural recording in that it records audio with two microphones arranged to simulate human listening, often by being attached to ear locations on a dummy human head. Playback of a binaural recording is different from both mono playback and stereo playback, and outputs different waveforms via the left and right channels that often differ not only in volume, but also in pitch, timing reverberation, and other audio properties. Binaural recording and playback allows the capture and reproduction of sound exactly as a listener would perceive it live and in person.

Unfortunately, binaurally-recorded audio typically requires the listener to use earphones or headphones to experience truly immersive binaural listening, as playback of binaurally-recorded audio via loudspeakers can result in dead zones or speaker "crosstalk" that can decrease the benefits of binaurally-recorded audio. Even though binaural recording results in superior reproduction of sound, binaural recordings primarily remain an oddity used for niche application today due to the difficulty of proper binaural recording, processing, and playback.

Therefore, there is a need for improved binaural audio recording, processing, and playback.

SUMMARY OF THE PRESENTLY CLAIMED SUBJECT MATTER

A first claimed embodiment of the present invention concerns a method for audio processing that includes receiving a first monaurally-recorded audio recording. The method also includes training a neural network that is communicatively coupled to two microphones positioned within audible range of one or more training speakers, wherein training the neural network includes outputting at least a subset of the received first monaurally-recorded audio recording via the one or more training speakers to be recorded by the two microphones. The method also includes receiving a second monaurally-recorded audio recording. The method also includes receiving one or more environment inputs including information about an environment. The method also includes generating a binaural recording based on at least the second monaurally-recorded audio recording, the received one or more environment inputs, and the trained neural network. The method also includes storing the binaural recording in a memory.

A second claimed embodiment of the present invention concerns a system for audio processing that includes a communication transceiver. The communication transceiver receives at least a first monaurally-recorded audio recording, a second monaurally-recorded audio recording, and one or more environment inputs include information about an environment. The system also includes a neural network that is communicatively coupled to two microphones positioned within audible range of one or more training speakers. Training the neural network includes outputting at least a subset of the received first monaurally-recorded audio recording via the one or more training speakers to be recorded by the two microphones. The system also includes a memory. The system also includes a processor coupled to the memory and to the neural network and to the communication transceiver. Execution of instructions stored in the memory by the processor performs a number of system operations. The system operations include generating a binaural recording based on at least the second monaurally-recorded audio recording, the received one or more environment inputs, and the trained neural network. The system operations also include storing the binaural recording in the memory.

A third claimed embodiment of the present invention concerns a non-transitory computer-readable storage medium that may have embodied thereon a program executable by a processor to perform a method for audio processing. The exemplary program method includes receiving a first monaurally-recorded audio recording. The method also includes training a neural network that is communicatively coupled to two microphones positioned within audible range of one or more training speakers, wherein training the neural network includes outputting at least a subset of the received first monaurally-recorded audio recording via the one or more training speakers to be recorded by the two microphones. The method also includes receiving a second monaurally-recorded audio recording. The method also includes receiving one or more environment inputs including information about an environment. The method also includes generating a binaural recording based on at least the second monaurally-recorded audio recording, the received one or more environment inputs, and the trained neural network. The method also includes storing the binaural recording in a memory.

DETAILED DESCRIPTION

Monaurally-recorded mono or stereo recordings may be processed and converted into binaurally-recorded audio recordings. An analog process of performing this involves output of at least subsets of the monaurally-recorded recording, such as isolated instrument/vocal tracks, to be played to a dummy with two microphones. A digital process of performing this includes simulating audio input from simulated locations corresponding to audio sources. A neural network process of performing this includes training a neural network using speakers and microphones and then automating conversion from monaural audio to binaural audio based on the training of the neural network. The neural network can also be trained with output speakers to eliminate or reduce dead zones and/or speaker crosstalk.

Figure 7:
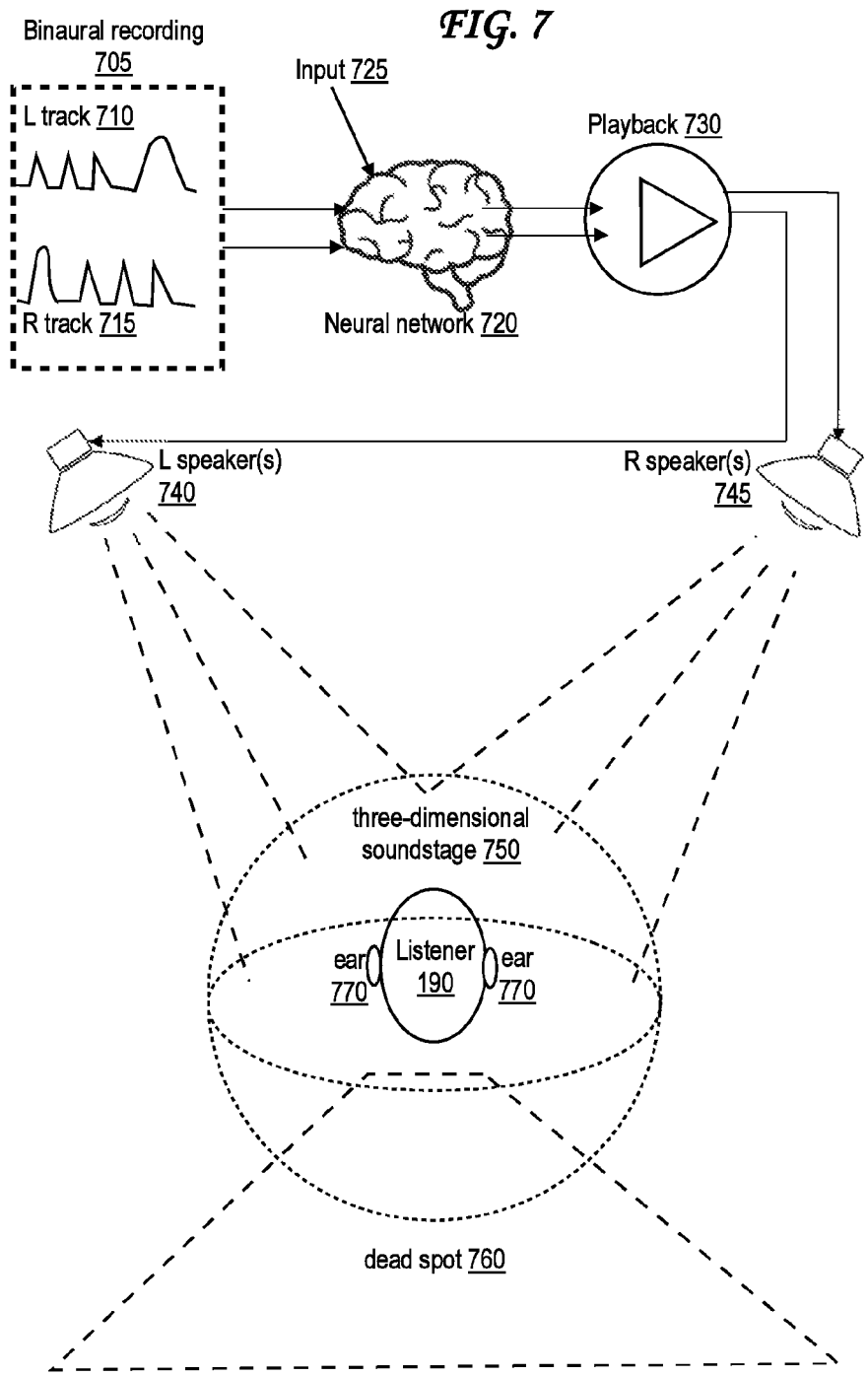
FIG. 7 illustrates a birds-eye perspective view of free-air loudspeaker-based reproduction of binaural audio to a listener.

The method and systems described herein address practical issues preventing the wide adoption of binaural sound imaging and reproduction and allow sound recordings from the mono and stereo era to be reprocessed and mastered into properly imaged binaural recordings that are backwards compatible with traditional stereo audio technology, thus opening up the entire history of sound recording to binaural representation. Once a neural network has been trained, binaural processing may be performed in real-time during playback or immediately before playback on modern media playing devices. The binaural recordings may be listened to using ordinary loudspeakers as illustrated in FIG. 7 in addition to earphones and headphones via training of neural networks to eliminate or limit dead zones and speaker crosstalk, and enables atmospherics to be added during mixing or during (or just before) playback.

Figure 1:
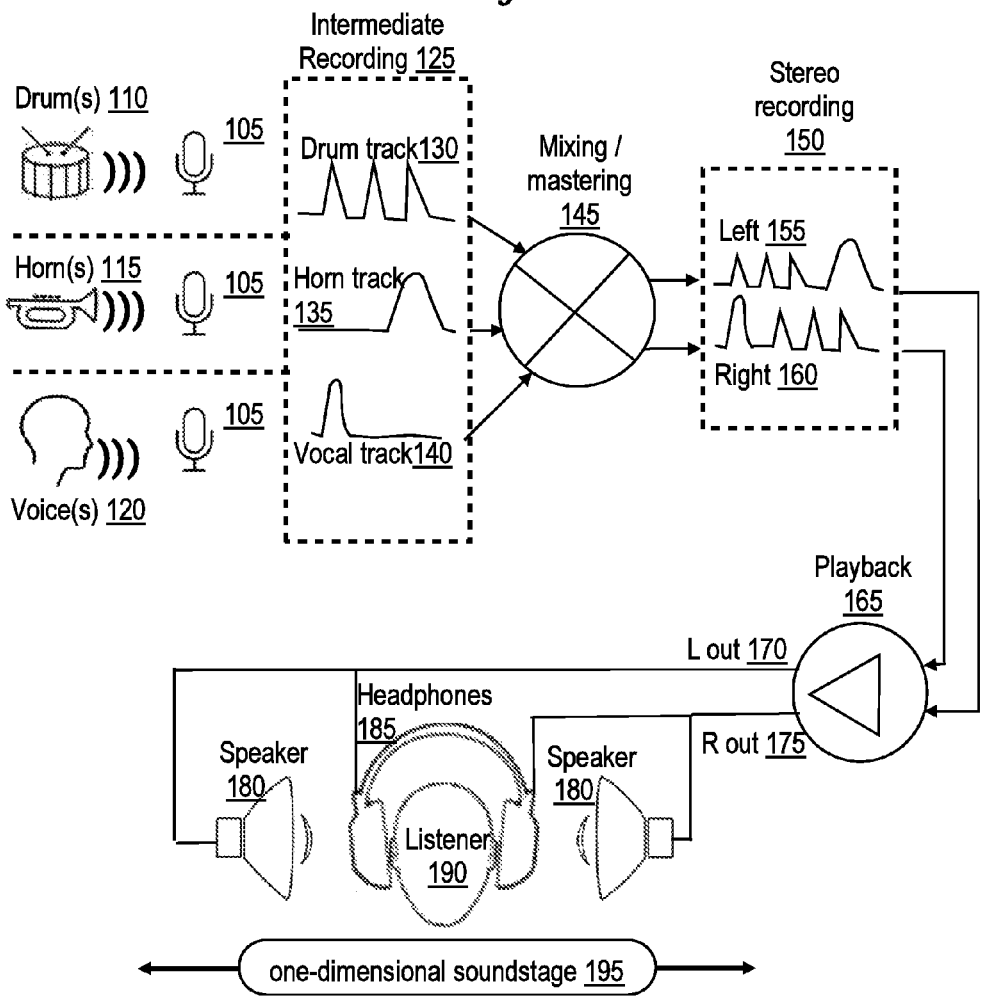
FIG. 1 illustrates a schematic view of a system for recording, processing and playing back stereo audio.

FIG. 1 illustrates a schematic view of a system for recording, processing and playing back stereo audio.

In a stereo recording as illustrated in FIG. 1, a single microphone 105 is used record multiple sound sources (i.e., multiple instruments or vocals) either together (i.e., simultaneously), separately (i.e., in different locations and/or at different times), or some combination thereof, with each recording producing a recorded track. For example, in FIG. 1, one or more drum(s) 110 are recorded using a microphone 105, producing a drum track 130. One or more horn(s) 115 are recorded using the microphone 105, producing a horn track 135. One or more voice(s) 120 of one or more singer(s), one or more speaker(s), or some combination thereof, is recorded using the microphone 105, producing a vocal track 140. The drum track 130, horn track 135, and vocal track 140 are each monaural tracks, and can optionally be stored on some intermediate media 125, such as analog, vinyl, magnetic, optical, or digital media.

At a later time, a mixing and mastering process 145 produces a stereo recording 150 that includes a left channel 155 and right channel 160 which together form a stereo pair which may optionally be later stored on some consumer media, such as vinyl, magnetic tape, optical disc, or digital recordings. This process allows post-recording control in creating a desired mix of volume, left to right pan, and other effects to be added post recording.

A media player playback function 165 plays the media, producing the stereo pair left 170 or right 175 that is heard through headphones 185 or by free air loudspeakers 180. The listener 190 then perceives a one-dimensional linear left to right stereo image or soundstage 195.

Figure 2:
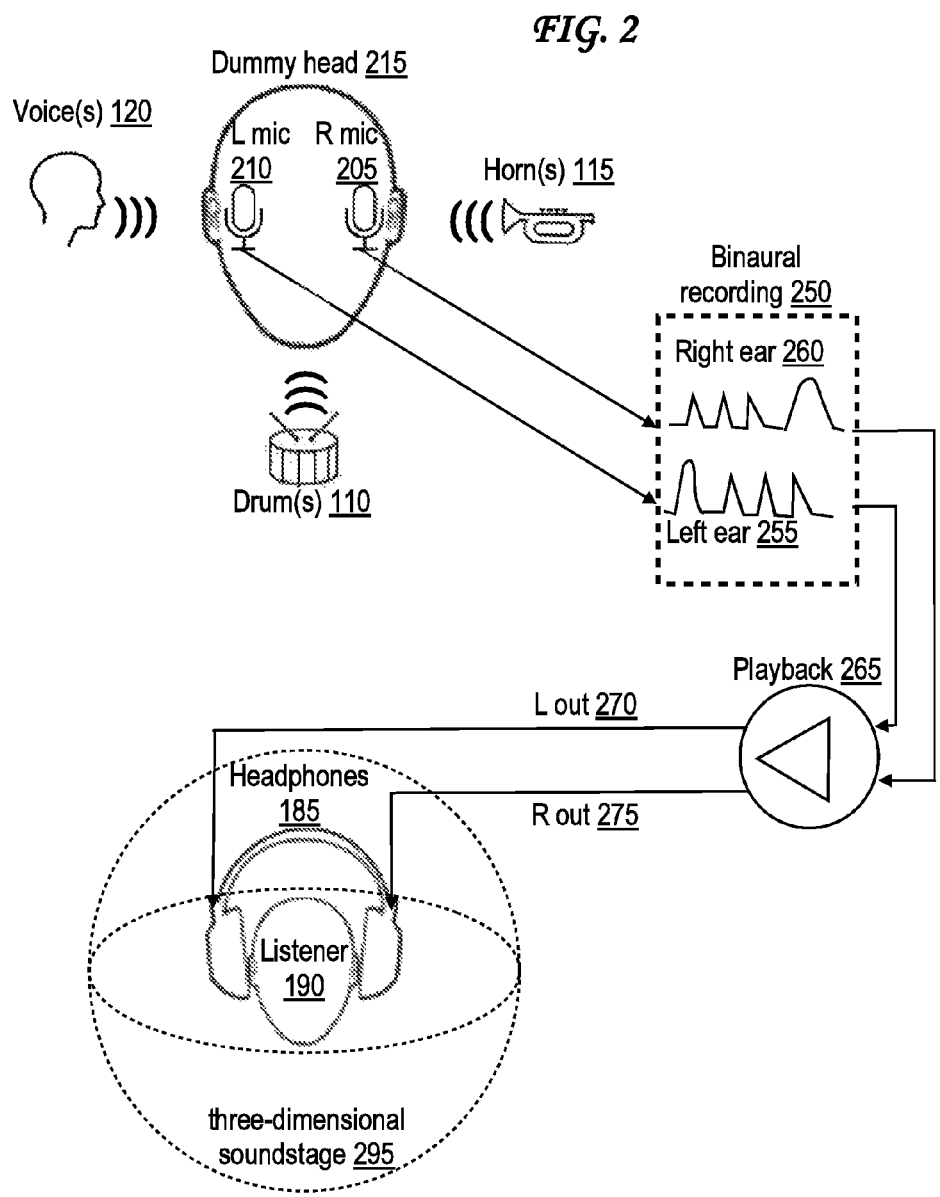
FIG. 2 illustrates a schematic view of a system for recording, processing and playing back binaural audio.

FIG. 2 illustrates a schematic view of a system for recording, processing and playing back binaural audio.

In a binaural recording as illustrated in FIG. 2, two microphones 105—namely, a right-ear microphone 205 and a left-ear microphone 210—are coupled to a dummy head 215, for example by being mounted at least partially inside dummy head 215 or affixed to the outside of dummy head 215. The two microphones are used to record binaural tracks from one or more audio sources, which in FIG. 2 include drum(s) 110, horn(s) 115, and voice(s) 120. In the environment illustrated in FIG. 2, all of these audio sources are present and playing simultaneously, unlike in FIG. 1. Binaural audio could, in an alternate embodiment (not shown), be recorded separately and binaurally for each audio source and mixed together via a mixing/mastering step 145 similar to the one illustrated in FIG. 1. In either case, the end result is a binaural track 250 that includes a left-ear track 255 and a right-ear track 260, which may then optionally be stored on media as a true binaural track pair.

The pickups for the right-ear microphone 205 and left-ear microphone 210 are located in, outside, or near a location corresponding to a human ear canal on the dummy head 215. In this way a stereo binaural pair is produced, which approximates the wave front pair an actual listener would hear in three dimensions if he were present, including atmospheric reflections of the surroundings.

A media player playback function 265 plays back the binaural pair of tracks 250 to the listener 190 through headphones 185, with the left ear track 255 translating into a left-ear output 270 and the right-ear track 260 translating into a right-ear output 275, thus generating a three-dimensional soundstage 295 for the listener 190.

Figure 3:
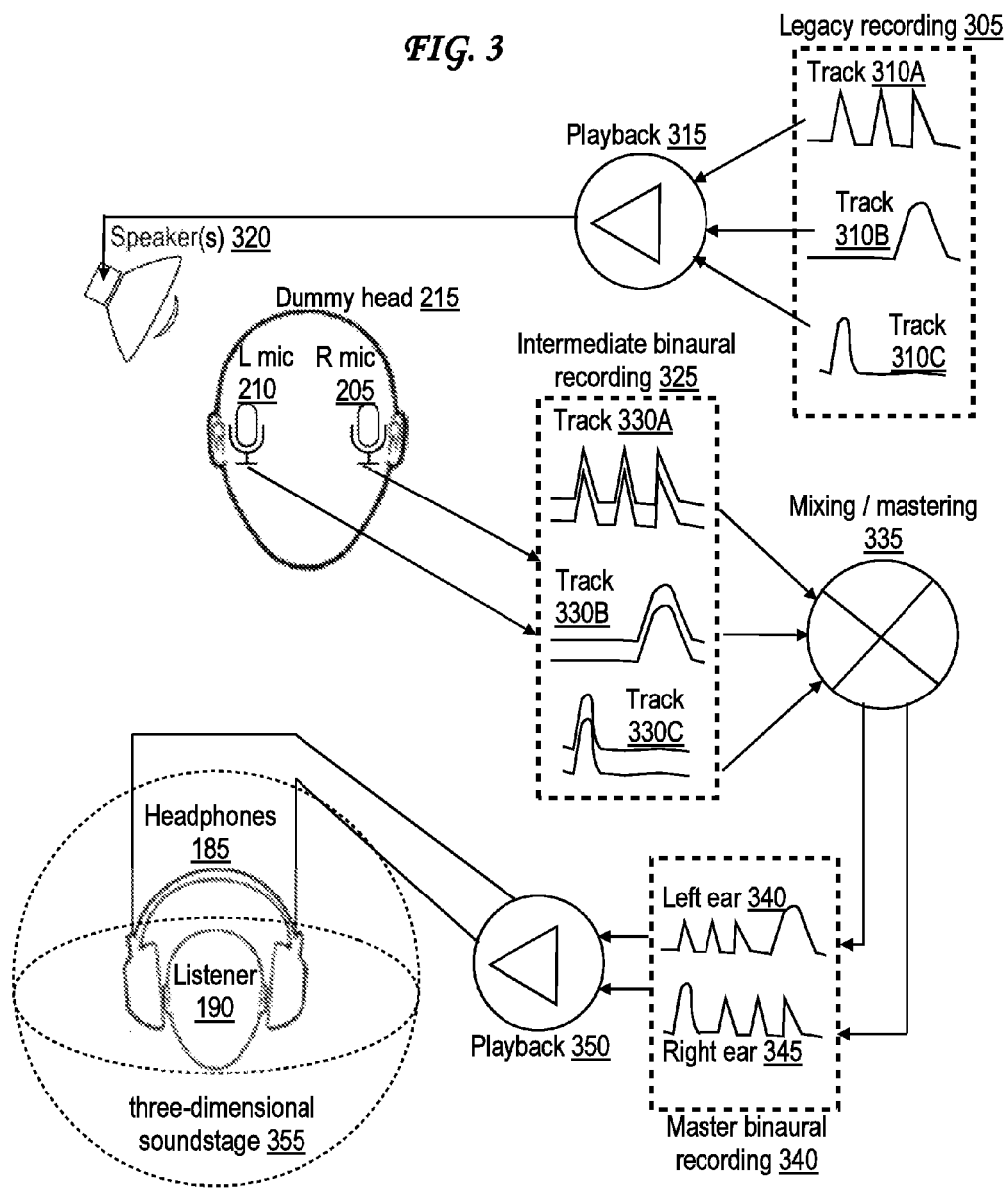
FIG. 3 illustrates a schematic view of analog binaural audio production operations based on legacy stereo or mono audio source(s).

FIG. 3 illustrates a schematic view of analog binaural audio production operations based on legacy stereo or mono audio source(s).

A legacy mono or stereo recording 305 can be re-mastered into binaural recordings using the analog audio operations illustrated in FIG. 3. If possible, the legacy mono or stereo recording 305 is broken apart into separate tracks, illustrated in FIG. 3 as track 310A, track 310B, and track 310C. These tracks may represent different audio sources, such as different instruments or vocals, and may be obtained from original intermediate recordings 125 if available. The tracks may alternately be extracted artificially via analog resampling and/or audio filters, such as high-pass filters, low-pass filters, phase inversions, reconstruction filters or some combination thereof.

Each track (310A, 310B, 310C) of the legacy recording 305 are then played, one track at a time, via one or more speakers 320 located in three-dimensional space around a dummy head 215 coupled to a right-ear microphone 205 and a left-ear microphone 210 as in FIG. 2. The one or more speakers 320 can be moved between tracks to change the apparent source of various sound sources or during tracks if panning is desired. Thus, when track 310A is played via the one or more speakers 320, the right-ear microphone 205 and left-ear microphone 210 generate a track 330A. When track 310B is played via the one or more speakers 320, the right-ear microphone 205 and left-ear microphone 210 generate a track 330B. When track 310C is played via the one or more speakers 320, the right-ear microphone 205 and left-ear microphone 210 generate a track 330C. Together, track 330A, 330B, and 330C represent an intermediate binaural recording 325, which may optionally be stored on media. The intermediate binaural recording 325 is then mixed together via mixing/mastering operations 335 into a master binaural recording 340 that includes a left-ear track 340 and a right-ear track 345.

In an alternate embodiment (not shown), different tracks (310A, 310B, 310C) of the legacy recording 305 may be played simultaneously via the one or more speakers 320, for example so that a first speaker plays track 310A and is located in a first location in three-dimensional space around dummy head 215, a second speaker plays track 310B and is located in a second location in three-dimensional space around dummy head 215, and a third speaker plays track 310C and is located in a third location in three-dimensional space around dummy head 215. In such an embodiment, no mixing step 335 is necessary, as the output of right-ear microphone 205 and left-ear microphone 210 will be the left-ear track 340 and a right-ear track 345 of the master binaural recording 340.

Once the master binaural recording 340 of FIG. 3 has been generated, it may be played back via media player playback operations 350 through headphones 185 to a listener 190 and results in a three-dimensional soundstage 355 much like the three-dimensional soundstage 295 of FIG. 2. The operations of FIG. 3 can be used to generate recordings compatible with standard media and standard playback devices designed for stereo recordings, and can be used to convert legacy media libraries to full binaural format.

Figure 4:
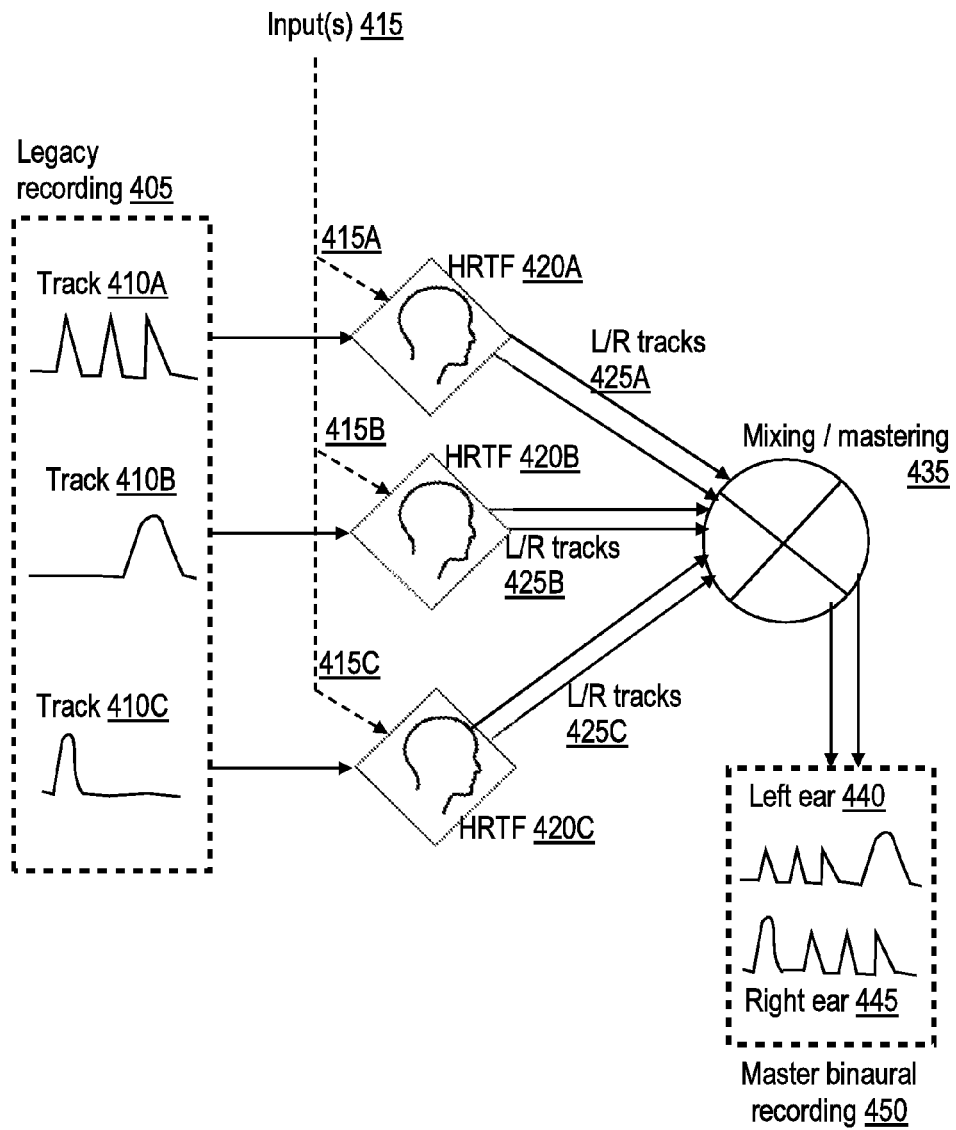
FIG. 4 illustrates a schematic view of digital-signal-processing-based binaural audio production based on legacy stereo or mono audio source(s).

FIG. 4 illustrates a schematic view of digital-signal-processing-based binaural audio production based on legacy stereo or mono audio source(s).

Digital signal processing (DSP) may be employed to re-master a legacy monaural or stereo recording 405 into a binaural recording as illustrated in FIG. 4. The legacy recording may include multiple tracks, which in the exemplary embodiment of FIG. 4 include track 410A, a track 410B, and a track 410C. These may be obtained from an intermediate recording 125 or may be extracted from a master recording as discussed in relation to FIG. 3.

Each track (410A, 410B, 410C) from legacy recording 405 is presented to a head-related transfer function (HRTF) 420. Three head-related transfer functions (HRTFs) are illustrated in FIG. 4, namely the head-related transfer function (HRTF) 420A, head-related transfer function (HRTF) 420B, and head-related transfer function (HRTF) 420C. In particular, legacy track 410A is sent to head-related transfer function (HRTF) 420A, legacy track 410B is sent to head-related transfer function (HRTF) 420B, and legacy track 410C is sent to head-related transfer function (HRTF) 420C.

Each legacy track 410A is sent to head-related transfer function (HRTF) 420 also receives an input 415. Namely, head-related transfer function (HRTF) 420A receives input 415A, head-related transfer function (HRTF) 420B receives input 415B, and head-related transfer function (HRTF) 420C receives input 415C. The inputs 415 are used to virtually control a location within a virtual three-dimensional soundstage from which the corresponding track originates, a direction/angle within the virtual three-dimensional soundstage in which the corresponding track is output, a volume of the corresponding track as output within the virtual three-dimensional soundstage, any distortion of the corresponding track as output within the virtual three-dimensional soundstage, or some combination thereof. The inputs 415 can be modified during mid-track to simulate a panning effect, for example, or to introduce distortion, or to change directions, or some combination thereof. Each head-related transfer function (HRTF) then outputs a left-ear track and a right-ear track, identified collectively in FIG. 4 as L/R tracks 425. That is, head-related transfer function (HRTF) 420A outputs a left-ear track and a right-ear track identified collectively as L/R tracks 425A, head-related transfer function (HRTF) 425B outputs a left-ear track and a right-ear track identified collectively as L/R tracks 425B, and head-related transfer function (HRTF) 420C outputs a left-ear track and a right-ear track identified collectively as L/R tracks 425C.

A mixing/mastering operation 435 is then used to combine the L/R tracks 425A, the L/R tracks 425B, and the L/R tracks 425C to produce a master binaural recording 450. The master binaural recording 450 includes a master left-ear track 440 based on the respective left ear tracks of the L/R tracks 425A, the L/R tracks 425B, and the L/R tracks 425C. The master binaural recording 450 also includes a master right-ear track 445 based on the respective right ear tracks of the L/R tracks 425A, the L/R tracks 425B, and the L/R tracks 425C. The master binaural recording 450 may then optionally be sent to headphones 185 (not shown) to provide a three-dimensional soundstage (not shown) for a listener 190 (not shown) in a similar manner to that illustrated in FIG. 2 and FIG. 3.

The use of the head-related transfer functions (HRTFs) 420 to transcode tracks to binaural left and right formats (as identified by L/R tracks 425) does not require resampling of each track, and can allow programmatic or user control of the apparent source in three dimensions via inputs 415 related to of each the legacy tracks 410A, 410B, and 410C. This process is entirely digital, and is compatible with standard mixing processes 435.

Figure 5:
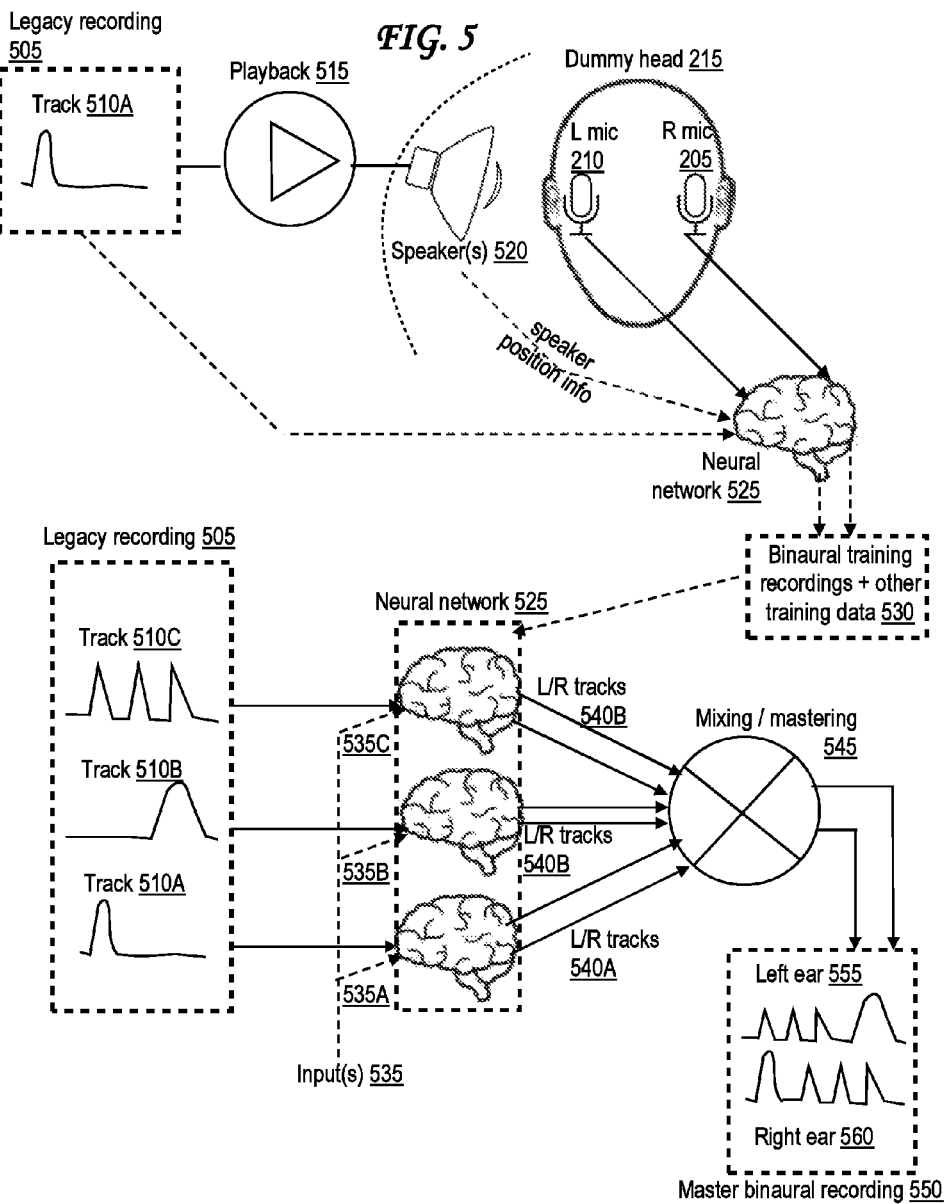
FIG. 5 illustrates a schematic view of digital-neural-network-based binaural audio production based on legacy stereo or mono audio source(s).

FIG. 5 illustrates a schematic view of digital-neural-network-based binaural audio production based on legacy stereo or mono audio source(s).

An artificial neural network may be employed as illustrated in FIG. 5 to re-master legacy monaural and stereo recordings into binaural. To train the digital network a track 510A from legacy recording 505 (which also includes at least tracks 510B and 510C) is played via a playback feature 515 of a media player through one or more speakers 520. The one or more speakers 520 are located somewhere in three-dimensional space around a dummy head 215. The dummy head is coupled to a left-ear microphone 210 and a right-ear microphone 205 and therefore records a left-ear track and a right-ear track.

The left-ear track and the right-ear track produced by the left-ear microphone 210 and the right-ear microphone 205 of FIG. 5 are presented to the neural network 525 as an input, along with an original copy of the track 510 from the legacy recording 505 and information regarding the positioning of the speaker(s) 520. The neural network 525 is "trained" using multiple different speaker positions (optionally outputting binaural training recordings 530) to perform desired monaural to binaural transcoding regardless of speaker positions. This training can produce binaural training recordings as well as other training data 530 that can be later used to inform the processing decisions of the neural network 525. This other training data 530 might, for example, include outputs from one or more artificial intelligence and/or machine learning algorithms used by the neural network 525.

Once the neural network 525 is trained, it can, for example, be used to process tracks 510A, 510B, and 510C of the legacy recording 505 given any positioning of the speaker(s) 520. Data representing an actual or virtual positioning of the speaker(s) 520 may be provided via input(s) 535, the positioning representing locations/directions/angles of desired apparent sound sources such as different instruments and vocals. The input(s) 535 may be provided as static values if the desired apparent sound source does not move during a track or dynamic values if the desired apparent sound source moves/pans during a track or suddenly shifts to a new location, such as a first guitarist switching with a second guitarist. For example, an input 535A may be provided to the neural network 525 when it is processing tack 510A, an input 535B may be provided to the neural network 525 when it is processing tack 510B, and an input 535C may be provided to the neural network 525 when it is processing tack 510C.

The neural network 525 then outputs a left-ear track and a right-ear track associated with each track of the legacy recording and its corresponding input of inputs 535. These left-ear tracks and a right-ear tracks output by the neural network 525 are identified collectively in FIG. 5 as L/R tracks 540. That is, the neural network 525 processes track 510A according to input 535A and its training data (from data 530) to produce L/R tracks 540A. The neural network 525 processes track 510B according to input 535B and its training data (from data 530) to produce L/R tracks 540B. The neural network 525 processes track 510C according to input 535C and its training data (from data 530) to produce L/R tracks 540C.

A mixing/mastering process 545 then combines L/R tracks 540A, L/R tracks 540B, and L/R tracks 540C to produce a master binaural recording 550, which includes a master left-ear track 555 and a master right-ear track 560. The master binaural recording 450 may then optionally be sent to headphones 185 (not shown) to provide a three-dimensional soundstage (not shown) for a listener 190 (not shown) in a similar manner to that illustrated in FIG. 2 and FIG. 3.

Referring again in more detail to the current invention in FIG. 5, the artificial neural network performs similar functions to the HRTF described in FIG. 4, but is more adaptable and less compute intensive once the network has been trained. The neural network 525 may be any type of neural network, but networks specifically tailored for time series processing are optimal, for example a time delay neural network (TDNN) or convolutional neural network (CNN) with supervised learning.

Figure 6:
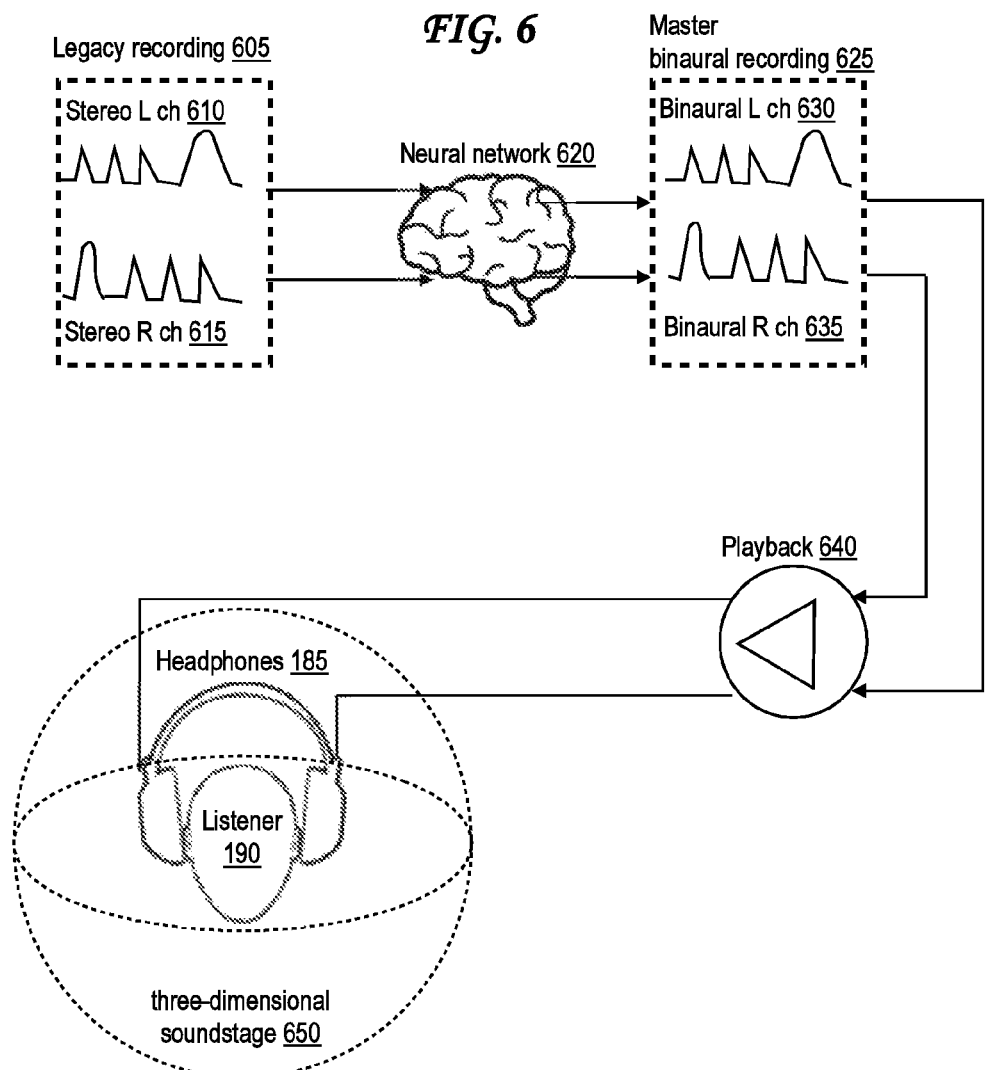
FIG. 6 illustrates a schematic view of digital-neural-network-based production of simulated binaural audio based directly on a legacy stereo source.

FIG. 6 illustrates a schematic view of digital-neural-network-based production of simulated binaural audio based directly on a legacy stereo source.

Referring now in more detail of the current invention, FIG. 6 illustrates how a trained artificial neural network 620 (e.g., see exemplary training of different neural network 525 in FIG. 5) may be employed to re-master a legacy monaural or stereo recording 605 when individual tracks are not available. This method takes a standard mono/stereo left channel signal 610 and a standard mono/stereo right channel signal 615 from the legacy recording 605 and translates one-dimensional stereo soundstage into a pseudo three-dimensional binaural representation, producing a master binaural recording 625 that includes a binaural left-ear channel 630 and binaural right-ear channel 635 optionally stored on media that can be played via a playback feature 640 of a media player. A listener 190 hears through headphones 185 binaural sound image 650 but in reduced detail, as the one dimensional sound stage is now represented as a curve in three dimensional space 650. This process can be used in real-time within the media player, either during playback 640 or immediately before playback 640, or can alternately be used an input in traditional mix mastering.

Referring again in more detail of the current invention in FIG. 6, the artificial neural network 620 is actually performing two functions. The first function correlates signal sources found in stereo left 610 and right 615 channels just a human brain would do, and arrives at an apparent source in one dimension (left to right) of each sound source present in the recording. The second function then maps the single dimensional left to right space into binaural left 630 and right 635 channels, which can be perceived by listener 190 as a three-dimensional soundstage 650.

The mapping may in some cases be limited to transforming these legacy stereo channels into a 360-degree two-dimensional soundstage instead of a fully three-dimensional binaural space 650. This is due to the fact that no up or down information was present in the original source legacy stereo left 610 and right 615 channels of the legacy recording. Three-dimensional up/down data may be simulated virtually in some cases, such as by the neural network 620 determining automatically that one sound track of a recording has characteristics that typically suggest it should sound "higher" or "lower" than another sound track. The neural network may simply learn these "higher" or "lower" characteristics via repeated training or may base these "higher" or "lower" characteristics on user inputs. Inputs 415 of FIG. 4 or inputs 535 of FIG. 5 are examples of inputs that could be used to adjust how a neural network like the neural network 620 of FIG. 6 could adjust up/down information to produce a richer three-dimensional soundstage 650 during playback 640 of binaural recordings.

Referring again in more detail to the current invention in FIG. 6, the entire processing steps can take place as a re-mastering operation done once while producing new media for distribution, or the neural network can be embedded as a processing step in media player playback operations 640, due to the lightweight computation requirements of the neural network once it is trained. Such an implementation would allow a pseudo binaural playback for any existing stereo audio owned by end users, without the requirements of purchasing a newly mastered binaural format of music they already own. The neural network can be optimized by use of any time series based neural topology, including convolutional networks with supervised learning.

FIG. 7 illustrates a birds-eye perspective view of free-air loudspeaker-based reproduction of binaural audio to a listener.

Referring now in more detail to the current invention in FIG. 7, from a top-down top down perspective illustrates how a differently trained artificial neural network 29 may be employed to correct the interference of the listener 16 head and ears 770 in free space when sound is produced via speakers 740/745 instead of headphones 185. The speakers 740/745 include one or more left speaker(s) 740 and one or more right speaker(s) 745, optionally augmented by one or more center speakers (not shown).

In normal binaural speaker output, a dead spot 760 is caused by the acoustic shadow of the listener 190 due to the interaction of the approaching acoustic wave with the shape of the listener head and ears 770. The transformation performed by the neural network 720 simulates binaural sound and simulates removal of the dead spot 760 restores the perception of sound sources behind the listener, recreating a three-dimensional sound stage 750 and is trained in a manner similar to the neural network training shown in FIG. 5.

The neural network 720, in this configuration, takes the binaural encoded input 705 and corrects the playback waveform 730 so that the sound at the listener 190 ears 770 are modified to match the waveform the listener 190 would hear if the wearing headphones. The neural network achieves this by modifying the arrival time and frequency spectrum of the wave front striking the listener 190, thus appearing to eliminate the sonic dead spot 760 as far as the listener 190 can hear, and producing distinct sounds for the left ear and right ear. These distinctions may be exaggerated to help overcome speaker "crosstalk" and thus make the three-dimensional soundstage 750 of FIG. 7 sound like it would if the listener 190 were wearing headphones. The waveforms played back 730 via the left speaker(s) 740 and right speaker(s) 745 may be tweaked by the trained neural network 720 to produce this exaggerated effect. An atmospheric input 725, which may describe the room and/or a location of the listener 190 relative to the left speaker(s) 740 and right speaker(s) 745, controls the desired atmospheric process to be applied by the neural network 720.

Referring again in more detail to the current invention shown in FIG. 7, this invention addresses an adoption barrier to binaural and provides superior sound than existing sound output techniques. When two speakers (a left speaker 740 and a right speaker 745) are used in normal arrangement (e.g., having a predetermined distance between the speakers 740/745) in front of the listener 190, the binaural perception of up and down and left and right is preserved, but the perception of front and back respective to the listener 190 is compressed to the area forward of the listener. It is desirable to be able to perceive sound sources behind the listener for the most accurate binaural reproduction. However, the approaching wave front is modified by the ears 770 of the listener 190 and as such is still perceived in the forward direction. The neural network 720 is trained to cancel out these effects, by reversing the effects each ear 770 will have on the left track 710 signals and right track 715 signals of binaural recording 705, thus allowing the original front-to-back dimension of the binaural effect to still be heard by the listener 190. Lastly, an atmospheric input 725 is used to control the addition of reflections, which the listener will perceive to be coming from his surroundings. For example, the input 725 can identify whether the speakers 740/745 are being played in a concert venue, a cathedral hall, a small room, a large room, an outdoor area, or some other location. The input 725 can also identify a different type of atmospheric venue, such as a concert venue, cathedral hall, small room, large room, outdoor area, whose acoustic characteristics the neural network 720 should seek to simulate. Training the neural network 725 so that it reproduces the reflections and reverberations that might be found in the environments identified in the input 725 produces acoustic atmospheric profiles. This is superior to often artificial-sounding reverberation filters traditionally overlaid over recordings during more traditional mixing and mastering processes.

Referring again in even more detail to the current invention shown in FIG. 7, the artificial neural network 725 may be any time series domain neural network, preferably trained via supervised learning. Once trained, the input 725 aids in controlling the environmental reflection type desired by the listener 190.

While the speakers 740/745 of FIG. 7 are illustrated in front of the listener 190, the same processes may be used if the speakers are instead behind the listener 190, to the side of a listener 190, above the listener 190, or diagonally across from the listener 190, in order to eliminate the dead zone blocked by the head and ears 770 of the listener 190 via the training of the neural network 720. "Crosstalk" of speakers can be similarly reduced or removed via training by the neural network.

Advantages granted by the systems and methods described herein include superior sound in all environments. Binaural listening in all environments is now possible and is far superior to other spatial methods of sound representation. Even speakers in open air can be used with full binaural effect with this invention, removing the strong association of binaural with headphone only use.

Advantages granted by the systems and methods described herein also include backward compatibility. Existing music libraries can be converted easily to binaural, and existing equipment capable of stereo reproduction can now play binaural. Real time in device pseudo binaural conversion or outboard processor allows consumers to listen to their existing stereo media with improved spatial imaging.

Advantages granted by the systems and methods described herein also include ease of production. New binaural recordings are much easier to produce due to removing the need to record new tracks with a binaural microphone combined with the adaptation of traditional stereo mixing and mastering workflow.

Advantages granted by the systems and methods described herein also include real time atmospherics. The ability to add atmospherics in real time allows listeners to adapt binaural to their surroundings. The ability to add atmospherics during mixing and mastering to binaural recordings removes the necessity of controlling the surroundings from new binaural recording sessions.

Advantages granted by the systems and methods described herein also include recoding, manipulating and playing back recordings that present or simulate a sound image to the listener in full binaural format with full control over the process including atmospheric surround sound based on binaural hearing.

Figure 8:
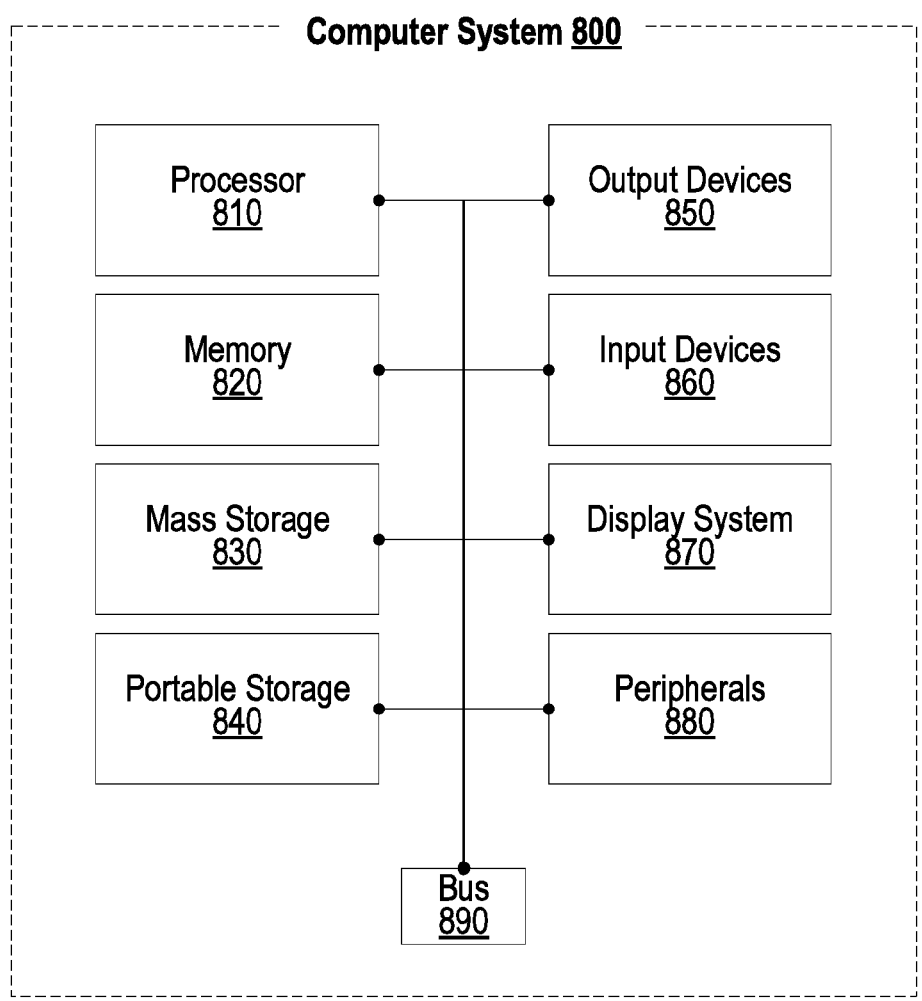
FIG. 8 is a block diagram of an exemplary computing device that may be used to implement an embodiment of the present invention.

FIG. 8 illustrates an exemplary computing system 800 that may be used to implement an embodiment of the present invention. Any of the computer systems or computerized devices described herein, may, in at least some cases, be a computing system 800. For example, these may include computer systems associated with HRTFs 420A, 420B, and 420C of FIG. 4; neural network(s) 525 of FIG. 5, neural network(s) 620 of FIG. 6, neural network(s) 720 of FIG. 7; and the media player(s) associated with playback functions 165, 265, 315, 350, 515, 640, and 730. The computing system 800 of FIG. 8 includes one or more processors 810 and memory 810. Main memory 810 stores, in part, instructions and data for execution by processor 810. Main memory 810 can store the executable code when in operation. The system 800 of FIG. 8 further includes a mass storage device 830, portable storage medium drive(s) 840, output devices 850, user input devices 860, a graphics display 870, and peripheral devices 880.

The components shown in FIG. 8 are depicted as being connected via a single bus 890. However, the components may be connected through one or more data transport means. For example, processor unit 810 and main memory 810 may be connected via a local microprocessor bus, and the mass storage device 830, peripheral device(s) 880, portable storage device 840, and display system 870 may be connected via one or more input/output (I/O) buses.

Mass storage device 830, which may be implemented with a magnetic disk drive or an optical disk drive, is a non-volatile storage device for storing data and instructions for use by processor unit 810. Mass storage device 830 can store the system software for implementing embodiments of the present invention for purposes of loading that software into main memory 810.

Portable storage device 840 operates in conjunction with a portable non-volatile storage medium, such as a floppy disk, compact disk or Digital video disc, to input and output data and code to and from the computer system 800 of FIG. 8. The system software for implementing embodiments of the present invention may be stored on such a portable medium and input to the computer system 800 via the portable storage device 840.

Input devices 860 provide a portion of a user interface. Input devices 860 may include an alpha-numeric keypad, such as a keyboard, for inputting alpha-numeric and other information, or a pointing device, such as a mouse, a trackball, stylus, or cursor direction keys. Additionally, the system 800 as shown in FIG. 8 includes output devices 850. Examples of suitable output devices include speakers, printers, network interfaces, and monitors.

Display system 870 may include a liquid crystal display (LCD), a plasma display, an organic light-emitting diode (OLED) display, an electronic ink display, a projector-based display, a holographic display, or another suitable display device. Display system 870 receives textual and graphical information, and processes the information for output to the display device. The display system 870 may include multiple-touch touchscreen input capabilities, such as capacitive touch detection, resistive touch detection, surface acoustic wave touch detection, or infrared touch detection. Such touchscreen input capabilities may or may not allow for variable pressure or force detection.

Peripherals 880 may include any type of computer support device to add additional functionality to the computer system. For example, peripheral device(s) 880 may include a modem or a router.

The components contained in the computer system 800 of FIG. 8 are those typically found in computer systems that may be suitable for use with embodiments of the present invention and are intended to represent a broad category of such computer components that are well known in the art. Thus, the computer system 800 of FIG. 8 can be a personal computer, a hand held computing device, a telephone ("smart" or otherwise), a mobile computing device, a workstation, a server (on a server rack or otherwise), a minicomputer, a mainframe computer, a tablet computing device, a wearable device (such as a watch, a ring, a pair of glasses, or another type of jewelry/clothing/accessory), a video game console (portable or otherwise), an e-book reader, a media player device (portable or otherwise), a vehicle-based computer, some combination thereof, or any other computing device. The computer system 800 may in some cases be a virtual computer system executed by another computer system. The computer can also include different bus configurations, networked platforms, multi-processor platforms, etc. Various operating systems can be used including Unix, Linux, Windows, Macintosh OS, Palm OS, Android, iOS, and other suitable operating systems.

In some cases, the computer system 800 may be part of a multi-computer system that uses multiple computer systems 800 (e.g., for one or more specific tasks or purposes). For example, the multi-computer system may include multiple computer systems 400 communicatively coupled together via one or more private networks (e.g., at least one LAN, WLAN, MAN, or WAN), or may include multiple computer systems 800 communicatively coupled together via the internet (e.g., a "distributed" system), or some combination thereof.

While the foregoing written description of the invention enables one of ordinary skill to make and use what is considered presently to be the best mode thereof, those of ordinary skill will understand and appreciate the existence of variations, combinations, and equivalents of the specific embodiment, method, and examples herein. The invention should therefore not be limited by the above described embodiment, method, and examples, but by all embodiments and methods within the scope and spirit of the invention.

While various flow diagrams provided and described above may show a particular order of operations performed by certain embodiments of the invention, it should be understood that such order is exemplary (e.g., alternative embodiments can perform the operations in a different order, combine certain operations, overlap certain operations, etc.).

The foregoing detailed description of the technology has been presented for purposes of illustration and description. It is not intended to be exhaustive or to limit the technology to the precise form disclosed. Many modifications and variations are possible in light of the above teaching. The described embodiments were chosen in order to best explain the principles of the technology, its practical application, and to enable others skilled in the art to utilize the technology in various embodiments and with various modifications as are suited to the particular use contemplated. It is intended that the scope of the technology be defined by the claim.

What is claimed is:

1. A method for audio processing, the method comprising:
receiving a first monaurally-recorded audio recording;
training a time delay neural network (TDNN) that is communicatively coupled to two microphones positioned within audible range of one or more training speakers, wherein the TDNN is trained using recorded waveforms recorded by the two microphones while the one or more training speakers output at least a subset of the received first monaurally-recorded audio recording;
receiving a second monaurally-recorded audio recording;
receiving one or more environment inputs that identify information about an environment;
generating a binaural recording using the trained TDNN based on at least the second monaurally-recorded audio recording and the received one or more environment inputs, wherein the trained TDNN automatically maps a plurality of different portions of the second monaurally-recorded audio recording to a plurality of different simulated three-dimensional locations, and wherein a left ear track differs from a right ear track of the binaural recording based on an interaural time difference (ITD) and the plurality of different simulated three-dimensional locations; and storing the binaural recording in a memory.

2. The method of claim 1, wherein the first monaurally-recorded audio recording is the same as the second monaurally-recorded audio recording.

3. The method of claim 1, wherein the first monaurally-recorded audio recording is distinct from the second monaurally-recorded audio recording.

4. The method of claim 1, wherein the memory is a non-transitory computer-readable storage medium.

5. The method of claim 1, wherein the memory is a physical storage medium, the physical storage medium being one of an analog storage medium, a vinyl-based storage medium, a magnetic storage medium, or an optical storage medium.

6. The method of claim 1, further comprising outputting the stored binaural recording via a headset, wherein the headset is one of an in-ear headset, an on-ear headset, or an over-ear headset.

7. The method of claim 1, wherein the TDNN is trained to reduce effects of a dead zone in which audio is at least partially blocked by the listener.

8. The method of claim 7, further comprising outputting the stored binaural recording via a second plurality of speakers, wherein the one or more training speakers is the same as the second plurality of speakers.

9. The method of claim 7, further comprising outputting the stored binaural recording via a second plurality of speakers, wherein one or more training speakers is distinct from the second plurality of speakers.

10. The method of claim 1, wherein the one or more environment inputs identify an area to be simulated, wherein the area is one of a concert venue, a cathedral hall, a room, or an outdoor area.

11. The method of claim 1, wherein the one or more environment inputs identify an area in which the binaural recording is to be output, wherein the area is one of a concert venue, a cathedral hall, a room, or an outdoor area.

12. The method of claim 1, wherein the one or more environment inputs identify one or more audio-origination locations in three-dimensional space relative to the two microphones.

13. The method of claim 1, wherein training the neural network further includes receiving one or more training inputs identifying information about a training environment, wherein the one or more training inputs identify an area in which the training takes place, wherein the area is one of a concert venue, a cathedral hall, a room, or an outdoor area.

14. A system for audio processing, the system comprising:
a communication transceiver, wherein the communication transceiver receives at least a first monaurally-recorded audio recording, a second monaurally-recorded audio recording, and one or more environment inputs that identify information about an environment;
a convolutional neural network (CNN) that is communicatively coupled to two microphones positioned within audible range of one or more training speakers, wherein the convolutional neural network is trained using recorded waveforms recorded by the two microphones while the one or more training speakers output at least a subset of the received first monaurally-recorded audio recording;
a memory; and
a processor coupled to the memory and to the convolutional neural network and to the communication transceiver, wherein execution of instructions stored in the memory by the processor:
generates a binaural recording using the trained convolutional neural network based on at least the second monaurally-recorded audio recording and the received one or more environment inputs, wherein the trained convolutional neural network automatically maps a plurality of different portions of the second monaurally-recorded audio recording to a plurality of different simulated three-dimensional locations, and wherein a left ear track differs from a right ear track of the binaural recording based on an interaural time difference (ITD) and the plurality of different simulated three-dimensional locations, and
stores the binaural recording in the memory.

15. The system of claim 14, wherein the first monaurally-recorded audio recording is the same as the second monaurally-recorded audio recording, and wherein receiving both the first monaurally-recorded audio recording and the second monaurally-recorded audio recording at the communication transceiver is the same operation.

16. The system of claim 14, wherein the first monaurally-recorded audio recording is distinct from the second monaurally-recorded audio recording.

17. The system of claim 14, further comprising a storage medium, wherein the binaural recording is further stored on the storage medium, wherein the storage medium is one of an analog storage medium, a vinyl-based storage medium, a magnetic storage medium, or an optical storage medium.

18. A non-transitory computer-readable storage medium, having embodied thereon a program executable by a processor to perform a method for audio processing, the method comprising:
receiving a first monaurally-recorded audio recording;
training a convolutional neural network (CNN) that is communicatively coupled to two microphones positioned within audible range of one or more training speakers, wherein the CNN is trained using recorded waveforms recorded by the two microphones while the one or more training speakers output at least a subset of the received first monaurally-recorded audio recording;
receiving a second monaurally-recorded audio recording;
receiving one or more environment inputs that identify information about an environment;
generating a binaural recording using the trained CNN based on at least the second monaurally-recorded audio recording and the received one or more environment inputs, wherein the trained CNN automatically maps a plurality of different portions of the second monaurally-recorded audio recording to a plurality of different simulated three-dimensional locations, and wherein a left ear track differs from a right ear track of the binaural recording based on an interaural time difference (ITD) and the plurality of different simulated three-dimensional locations; and
storing the binaural recording in a memory.

19. A system for audio processing, the system comprising:
a communication transceiver, wherein the communication transceiver receives at least a first monaurally-recorded audio recording, a second monaurally-recorded audio recording, and one or more environment inputs that identify information about an environment;

a time delay neural network (TDNN) that is communicatively coupled to two microphones positioned within audible range of one or more training speakers, wherein the time delay neural network is trained using recorded waveforms recorded by the two microphones while the one or more training speakers output at least a subset of the received first monaurally-recorded audio recording;

a memory; and a processor coupled to the memory and to the time delay neural network and to the communication transceiver, wherein execution of instructions stored in the memory by the processor:

generates a binaural recording using the trained time delay neural network based on at least the second monaurally-recorded audio recording and the received one or more environment inputs, wherein the trained time delay neural network automatically maps a plurality of different portions of the second monaurally-recorded audio recording to a plurality of different simulated three-dimensional locations, and wherein a left ear track differs from a right ear track of the binaural recording based on an interaural time difference (ITD) and the plurality of different simulated three-dimensional locations, and stores the binaural recording in the memory.

* * * * *